United States Patent [19]

Brown

[11] Patent Number: 4,494,263
[45] Date of Patent: Jan. 22, 1985

[54] POLLEN TRAP FOR BEEHIVES WITH BEE FLIGHT CONTROL

[76] Inventor: Royden Brown, 4343 E. Keim Dr., Phoenix, Ariz. 85253

[21] Appl. No.: 491,773

[22] Filed: May 5, 1983

[51] Int. Cl.³ .............................................. A01K 47/06
[52] U.S. Cl. ....................................................... 6/4 R
[58] Field of Search ........................................ 6/1, 4 R

[56] References Cited

U.S. PATENT DOCUMENTS

| | | | |
|---|---|---|---|
| 141,443 | 8/1873 | Latchaw | 6/4 R |
| 1,370,775 | 3/1921 | Bacon | 6/4 R X |
| 1,911,466 | 5/1933 | Powell | 6/1 |
| 3,995,338 | 12/1976 | Kauffeld | 6/4 R |
| 4,007,504 | 2/1977 | West | 6/4 R |
| 4,291,424 | 9/1981 | Angelis | 6/4 R |
| 4,337,541 | 7/1982 | Brown | 6/4 R |
| 4,351,074 | 9/1982 | Robson | 6/1 |

FOREIGN PATENT DOCUMENTS 1223455 of 0000 France .

OTHER PUBLICATIONS

"The Andes Pollen Trap", by Manuel R. Chepote Malatesta, Jan. 1979, American Bee Journal.

Primary Examiner—Robert P. Swiatek
Attorney, Agent, or Firm—Warren F. B. Lindsley

[57] ABSTRACT

A pollen trap for use on honeybee colonies employing a pollen collecting drawer and having an entranceway into the trap positioned either above or below the pollen collecting drawer and employing a pivotally movable barrier in the entranceway for selectively prohibiting the bees from entering the pollen trap.

3 Claims, 15 Drawing Figures

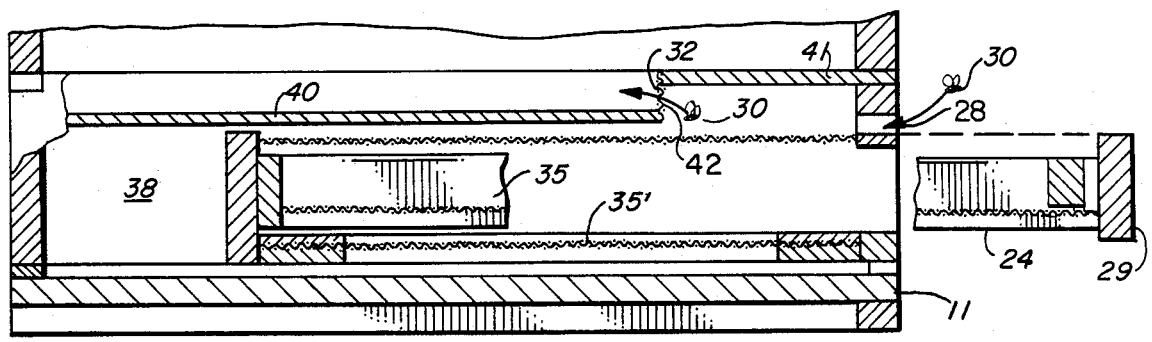
FIG-9
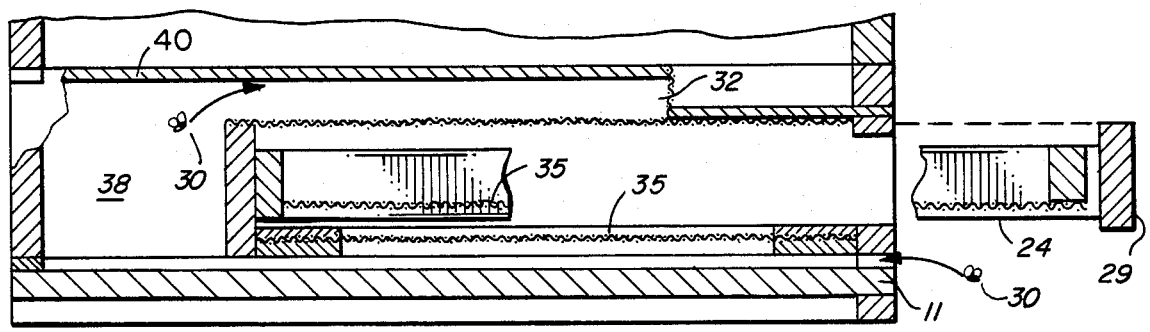
FIG-10
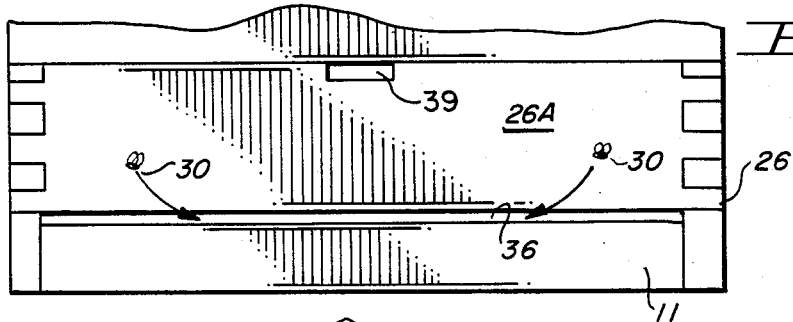
FIG-11
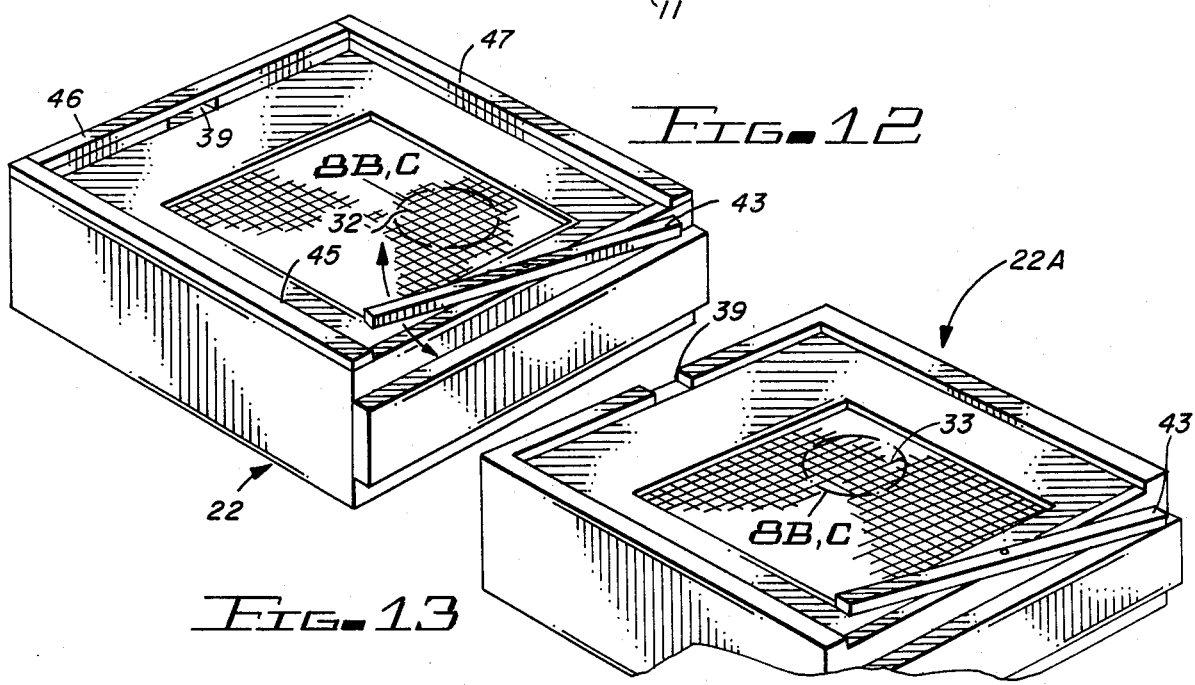
FIG-12
FIG-13

POLLEN TRAP FOR BEEHIVES WITH BEE FLIGHT CONTROL

BACKGROUND OF THE INVENTION

Floral pollen is the male seed (sperm) of flowers which brings about the fertilization of the plant. This pollen consists of tiny corpuscles, 500/1000ths of a millimeter, and is produced in so-called "anthers" which form the upper part of the "stamens" of a plant. These stamens, which vary in number, according to the species of the plant, grow up from the base of the flower as delicate filaments which are broadened into small pads at their free ends. In these pads, the pollen is formed and from these anthers, the foraging bees collect their pollen.

The worker bees who collect pollen mold it into a solid mass with a little honey and then attach the resulting kernel to the outer part of their hind legs.

When a pollen collecting worker bee returns to its hive, it stores the pollen in a separate group of cells from the honey inside the honeycombs, to be taken out again when needed.

Since pollen is considered by many the perfect food, and by others, a diet supplement, it is collected from honeybees by means of pollen traps which are attached to their hives. In many of the prior art uses, a grid is placed over the hive entrance so that the bees have to push through it to get into the hive. In doing so, the pollen pellets are dislodged from their legs and fall into a trough.

DESCRIPTION OF THE PRIOR ART

Pollen traps have been placed over the hive entranceways to collect pollen with most of the pollen contaminated with large amounts of trash, including dead bees accumulated in a pile between the hive entrance and the pollen trap.

Prior art pollen traps that are attached to the entranceways to the hives agitate the bees when the traps are removed and interrupt the flight of the bees into the hives causing them to gather in front of the hive, often in clusters.

U.S. Pat. No. 4,337,541 discloses a pollen trap for use on honeybee colonies employing a pollen collecting drawer which may be removed from any side of the hive, provides a cluster space for the worker bees in the pollen trap, forms with the bottom board a hive entranceway, collects the pollen, and is removed from the hive to obtain the pollen.

U.S. Pat. application Ser. No. 354,882, filed Mar. 4, 1982 and entitled Pollen Trap for Beehives with Dual Entranceways, filed by the same applicant of this invention, is a further improvement of the prior art.

U.S. Pat. application Ser. No. 428,050, filed Sept. 29, 1982 and entitled Pollen Trap for Double Queen Colony with Queen Excluder, filed by the same applicant of this invention, is a still further improvement of the prior art.

Other patents of interest are U.S. Pat. Nos. 3,995,338; 4,007,504 and French Pat. No. 1,223,455; which disclose pollen traps of one form or another.

Manuel R. Chepote Malatesta, in his article published January, 1979 in the *American Bee Journal*, entitled "The Andes Pollen Trap", discloses the benefits of a double layer wire mesh for removing pollen from the legs of the bees.

No known prior art exists wherein a pollen trap is provided with a closable entranceway or free flight bee excluder.

SUMMARY OF THE INVENTION

In accordance with the invention claimed, a new and improved pollen trap is provided which forms an entranceway to the hive which may be opened or closed to control the flight or movement of the bees into the hive.

It is, therefore, one object of this invention to provide a new and improved pollen trap.

Another object of this invention is to provide a new and improved pollen trap which controls flight movement of the bees into the pollen trap.

A further object of this invention is to provide a pollen trap, the entranceway of which may be selectively opened or closed.

A still further object of this invention is to provide a new and improved pollen trap for a beehive employing a flight controlled entranceway for the worker bees and separate entranceway for drones and queen bees.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 9 is a cross-sectional view of a modification of the pollen trap and drawer shown in FIG. 6 illustrating a further front entranceway for the bees;

FIG. 10 is a cross-sectional view of a further modification of the pollen trap and drawer shown in FIGS. 6 and 9 illustrating a bee entranceway below the drawer;

FIG. 11 is an end view of the pollen traps shown in FIGS. 6, 9 and 10 showing the drone and queen bee entranceway and the worker been entranceway at the back of the pollen drawer;

FIG. 12 is a modification of an existing pollen trap of the type shown in FIGS. 6, 9 and 10 embodying an entranceway barrier or bee excluder; and FIG. 13 is a new pollen trap built to embody the bee excluder shown in FIG. 12.

DESCRIPTION OF THE PREFERRED EMBODIMENT

Figure 1:
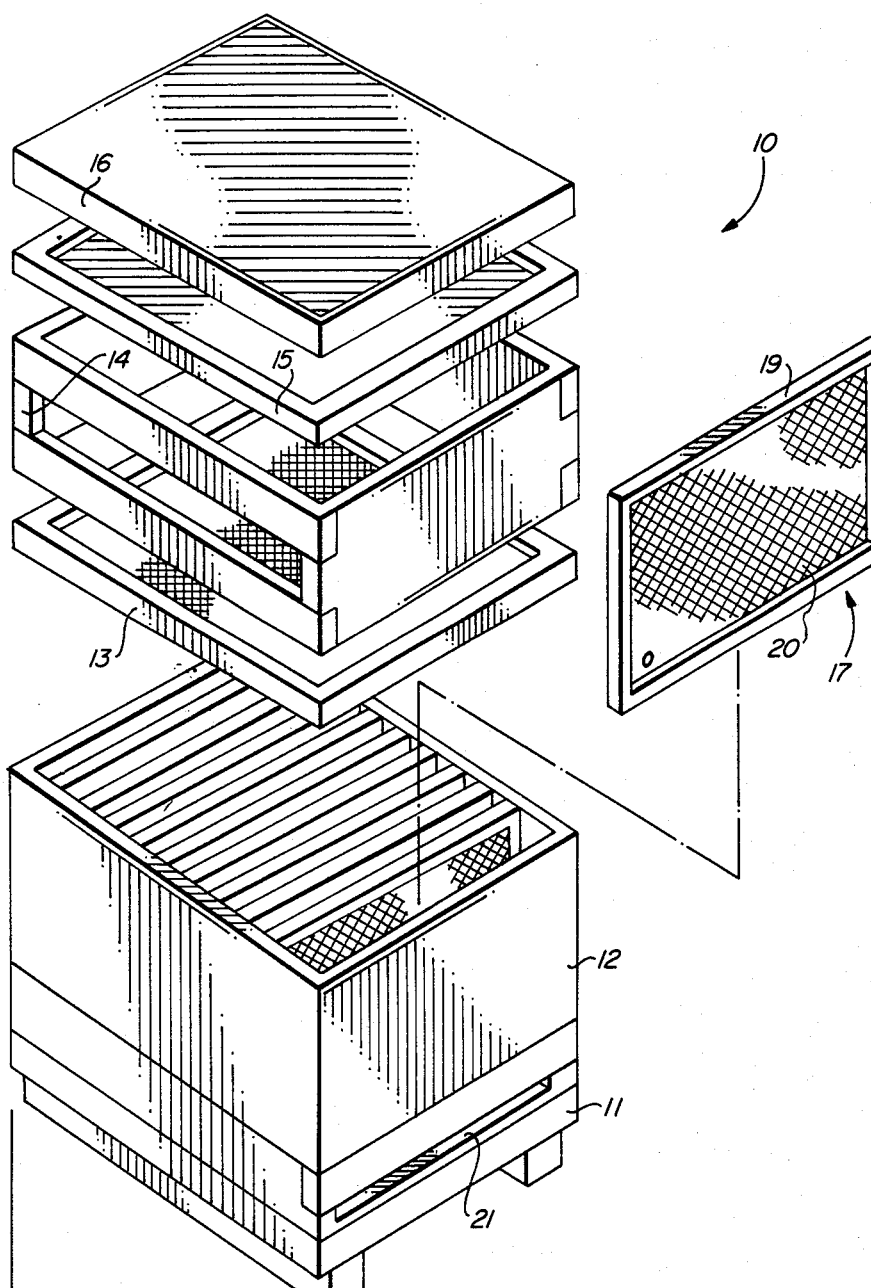
FIG. 1 is a perspective exploded view of a modern beehive.

Referring more particularly to the drawings by characters of reference, FIG. 1 discloses a modern beehive 10 comprising a pallet supported bottom board 11, a brood nest or box 12, a queen excluder 13 comprising a grate mesh formed of wire 0.163 to 0.167 inches apart, one or more honey storage supers 14, an inner cover 15 and a cover or roof 16.

The queen excluder 13 has spaces wide enough so that worker bees may pass through, but the queen and drone bees cannot. If the queen excluder is placed above the brood nest, the queen is confined in that area and cannot lay eggs in the honey storage area of the supers.

The brood nest 12 and super 14, comprising an open ended rectangular shell, contain a plurality of hanging combs or frames 17. Although ten frames are shown in the brood nest 12 in FIG. 1, many beekeepers use nine frames in the standard hive. The slightly wider spacing makes it easier to remove the combs and to inspect the brood nest.

In the super 14 (and honey storage area), beekeepers use nine frames evenly spaced. By using nine frames in a ten-frame beehive, the bees, due to the wider spacing in the super than in the brood nest, draw out the cells making them deeper, thereby easier to uncap by the beekeeper.

There are also eight to twelve-frame beehives with smaller or larger brood boxes, respectively. The disclosed pollen traps are built smaller or larger to fit these often called non-standard hives.

Each hanging frame 17 is rectangular in form and designed to leave a bee space all around. Lugs (not shown) may be formed as extensions of the top bar 19 so that the frames can be hung from rebates in the side walls of the brood nest and super or from the built-out portions of these parts of the hive as well known in the art. Sheets of wax foundation 20 complete the well-known frame construction.

An entranceway 21 into the beehive is generally formed between the bottom board 11 and the bottom of the brooder box 12, as shown in FIG. 1.

In accordance with the invention claimed, a new and improved pollen trap 22 is added to the modern beehive 10 in such a manner that the flight of bees coming into the hive may be controlled.

Figure 2:
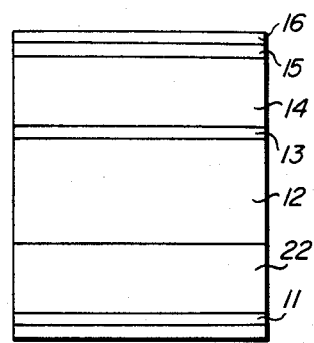
FIG. 2 is a side view of a modification of the beehive shown in FIG. 1 employing the new pollen trap at its base.
Figure 3:
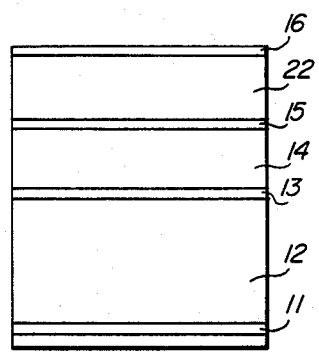
FIG. 3 is a view similar to FIG. 2 showing the novel pollen trap at the top of the beehive.
Figure 4:
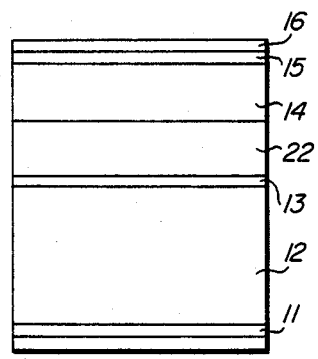
FIG. 4 is a view similar to FIGS. 2 and 3 showing the novel pollen trap in the center of the beehive.
Figure 5:
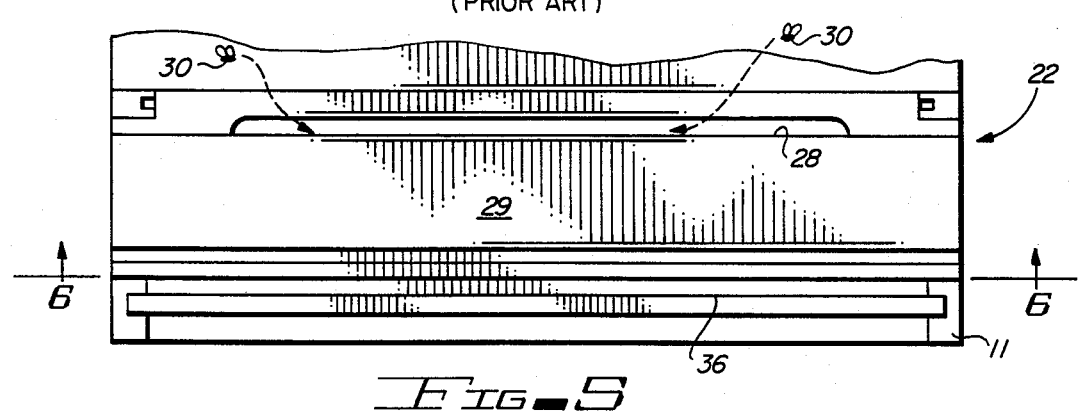
FIG. 5 is a front view of the novel pollen trap disclosed and embodying the invention.
Figure 6:
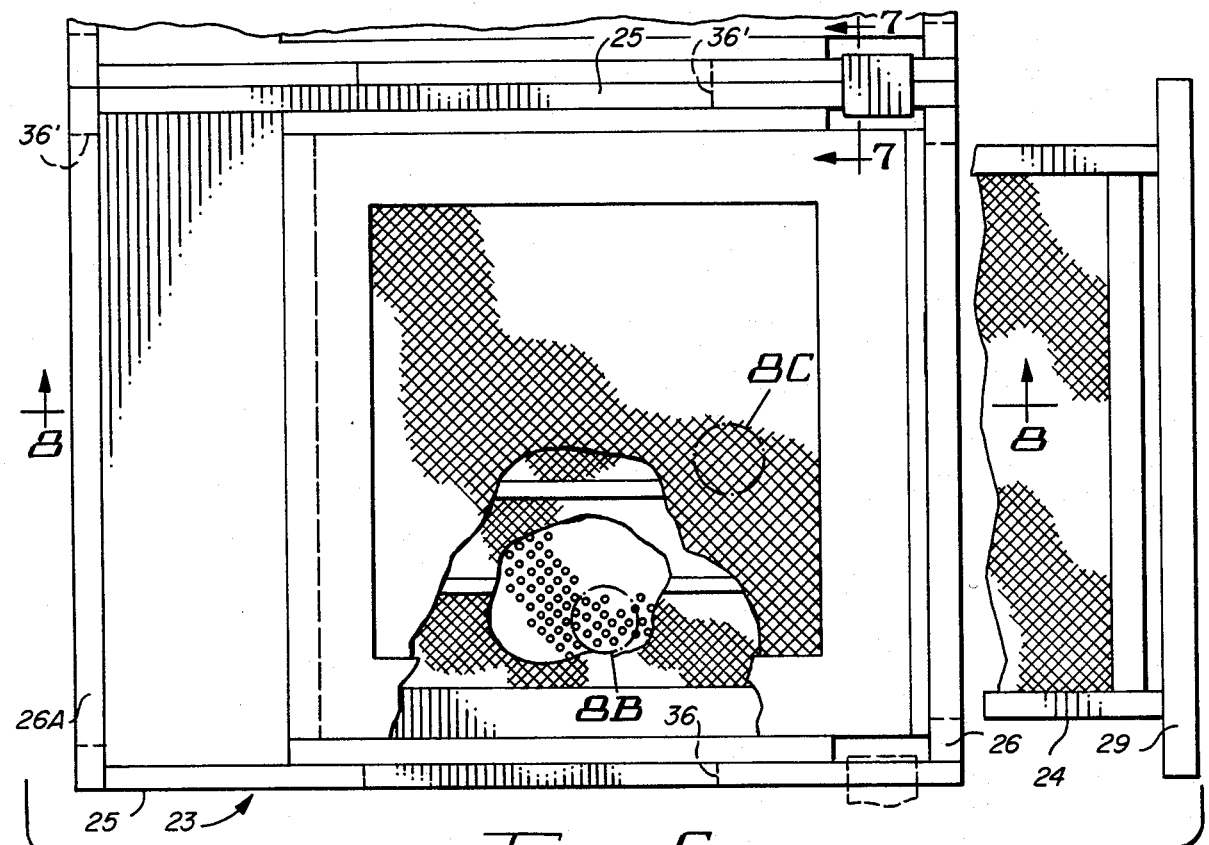
FIG. 6 is a top view, partially broken away, of the pollen trap shown in FIG. 5 with the drawer shown partially withdrawn.
Figure 7:
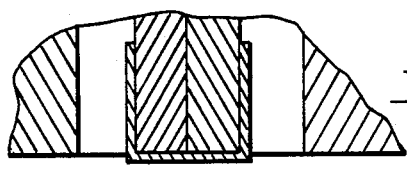
FIG. 7 is a cross-sectional view of FIG. 6 taken along the line 7—7.

Although the pollen trap 22 is generally mounted on the bottom board 11 and between it and the brood box 12, as shown diagrammatically in FIG. 2, it may also be mounted at the top of the hive, as diagrammatically shown in FIG. 3, or in the middle of the hive, as diagrammatically shown in FIG. 4, and operate effectively. The parts of the hives, including the addition of the pollen trap 22, may be readily interconnected by suitable means such as a pin and socket arrangement, not shown.

Figure 8:
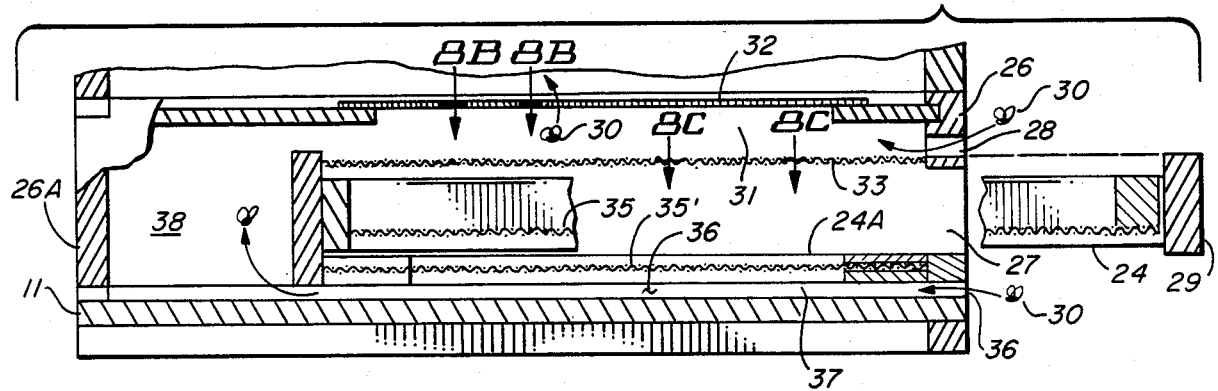
FIG. 8 is a cross-sectional view of FIG. 6 taken along the line 8—8.

FIGS. 5-8 disclose in more detail pollen trap 22 which may be positioned in any one of the three positions diagrammatically shown in FIGS. 2-4. This pollen trap comprises an open-ended, rectangular, box-like frame 23 having a rectangularly-shaped drawer 24 slidably mounted on a pair of rails 24A, one of which is shown in FIG. 8, fastened to the sides 25 of frame 23 and arranged to extend into frame 23 from end 26 thereof through an opening 27. An entranceway 28 is provided above the plate or handle 29 of the drawer for the worker bees 30 to enter the pollen trap, as shown in FIG. 8, and extends laterally across the longitudinal axis of drawer 24. It directs the bees upwardly through a passage 31 extending between a grating or offset screen 32 of predetermined size mesh and a lower screen 33. Screen 33 comprises a mesh smaller than the size of the worker bees and forms a barrier over the top of drawer 24.

It should be noted that a different diameter of screen 35 is used on the bottom of the pollen drawer and another screen 35' on the bottom of frame 23, as shown in FIG. 8.

When the humidity is dry and below 30-50%, relatively small mesh screens are used on the bottom of drawer 24 and frame 23, since air circulation is not necessary to dry out the pollen. When the humidity is above 80%, a wire mesh of a relatively larger size is used on the bottom of the pollen drawer to permit the maximum circulation of air and heat through the pollen to help remove the moisture and dry the pollen.

It is proposed that a screen having 7 squares to the inch formed from wire of a diameter 0.018 of an inch be used over the pollen drawer to allow the pollen to fall through into the pollen drawer and yet keep the bees out of the pollen drawer. The 8 squares to the inch screen heretofore used in such a small mesh that, in the times of pollen flows of large granules, they pile up on the corners of the wire and eventually create a solid mass of pollen up through the wire and theoretically could permit the colony to smother. Wire mesh of 6 squares to the inch is large enough so that bees penetrate the wire and enter the pollen drawer; yet the wire is small enough that the bees cannot then escape, but are left in the pollen drawer to eat the pollen and eventually die. Neither the 8 nor the 6 squares to the inch mesh is correct for the screens over the pollen drawer. Seven squares to the inch is ideal and serves and accomplishes both tasks of allowing the pollen to free flow into the pollen drawer, regardless of the size of the granules, and yet keeps all bees out of the pollen drawer.

This trap is unique in that screen 32 comprises a plate having a mesh employing 7 round holes of 3/16 inch diameter per square inch.

As indicated in FIG. 8, most of the bees enter the hive and the pollen trap through the entranceway 28 and move into and along a passageway 31 between grids or screens 32 and 34. At this point, the bees have to crawl through the opening in the grid or screen 32. The function of the pollen traps is to force the incoming foraging bees with pollen pellets on their hind legs to twist their bodies through the opening in screen or grid 32. In twisting through the grid, pollen pellets are scraped off their legs and fall down through screen 33 into the pollen drawer 24 above screen 35 positioned at the bottom of the drawer.

A further entranceway 36 and passageway 37 is provided between frame 23 of the pollen trap 22 and the top of bottom board 11, as shown in FIG. 8. This entranceway 36, which has an opening extending across the end of the pollen trap immediately below drawer 24, directs the bees 30 through passageway 37 to a space 38 behind drawer 24 and then over screen 33 into passageway 31. The bees then pass through screen or grid 32 in the same manner as the bees entering the pollen trap 22 through entranceway 28.

With the dual entranceway and passageway shown, the bees can enter the hive above and below the drawer 24 without clustering to get in and then are directed to pass through the screen 32 from both ends thereof. Thus, the bees are spread out over more of the grid structure than heretofore possible with a single entranceway.

Figure 8B:
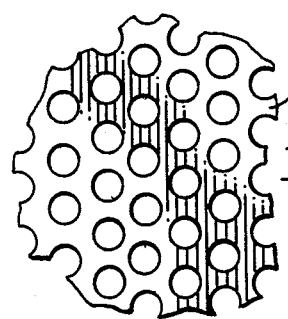
FIG. 8B is an enlargement of the circled area labeled 8B in FIG. 6.
Figure 8C:
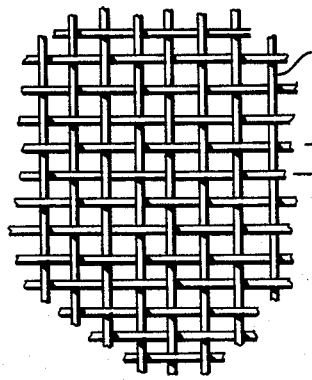
FIG. 8C is an enlargement of the circled area labeled 8C in FIG. 6.

FIGS. 8B and 8C show enlargements of the screen or grid configuration.

FIG. 11 illustrates that the entranceway 36 may be positioned to open from the back 26A of the beehive; i.e., from the side opposite to that provided for drawer 24, by merely reversing the bottom board 11. With this arrangement, the bees immediately enter space 38 from the entranceway 36 and do not have to travel the length of the other passageway 37, as is necessary with the structure shown in FIG. 8. Exits 39 shown in FIGS. 11, 12 and 13 provided at rear of the pollen trap are used by drones and the queen bee.

FIG. 9 illustrates a modification of the pollen trap 22 shown in FIGS. 1–8 wherein drawer 24 is covered by a barrier comprising offset parallel arranged parts 40 and 41 which form between their juxtapositioned ends an entranceway 42 into the hive at a position above drawer 24. This entranceway is covered by screen or grate 32.

FIG. 10 illustrates a further modification of the pollen trap 22 wherein the juxtapositioned ends of parts 40 and 41 are interconnected by grate 32 with the entranceway 36 being below drawer 24. Thus, bees 30 entering the hive through entranceway 36 pass through passageway 37, space 38 and through screen or grate 32 and into the beehive, as shown.

In accordance with the invention claimed, pollen trap 22 is modified to selectively block or open an entranceway into the beehive through the pollen trap. As shown in FIG. 12, the frame of the pollen trap is modified to include a bee excluder or part 43 pivotally mounted on frame 23 within entranceway 28 so as to selectively open or close the entranceway to admit or exclude bees from the hive.

When part 43 is pivoted to a position laterally of the longitudinal axis of drawer 24, it opens entranceway 28 and admits bees into the beehive. When part 43 is moved to a point where it is flush with the outside surface of frame 23, it closes entranceway 28 and keeps bees from entering the beehive.

FIG. 12 illustrates a presently known pollen trap modified to employ the bee excluder feature. This is accomplished by placing strips 45, 46 and 47 around the top edges of frame 23, as shown. These strips are of the same height as part 43 and serve merely to increase the height of the pollen trap a bit without changing its function.

FIG. 13 illustrates a pollen trap 22A built to accommodate the pivotally mounted bee excluder, or part 43, in the manner shown.

It should be noted that the bee excluder 43 is mounted in the entranceway, whether the entranceway is positioned in the beehive above or below the drawer 24.

An improved pollen trap for beehives is thus disclosed in accordance with the stated objects of the invention and although but a few embodiments of the invention have been illustrated and described, it will be apparent to those skilled in the art that various changes and modifications may be made therein without departing from the spirit of the invention or from the scope of the appended claims.

What is claimed is:

1. A pollen trap for collecting pollen from bees as they enter a beehive comprising:
   a frame having an open top and dimensioned to fit as one of the axially positioned parts of a vertically stacked beehive,
   a drawer slidably arranged in said frame to assume a substantially horizontal position in the beehive,
   said drawer having a bottom surface comprising a first screen, the mesh size of which is smaller than the pollen dropped thereon by the bees,
   a second screen mounted in said frame above said drawer and having a mesh size smaller than the size of the pollen carrying bees for prohibiting them from entering the drawer,
   a third screen mounted on said frame above said second screen and forming an elongated space therebetween,
   said third screen having a mesh opening causing bees crawling through said third screen to divest their legs of a substantial portion of the pollen carried thereon,
   an entranceway for the pollen carrying bees into the pollen trap positioned adjacent the front of said drawer and connected with the space between said second screen and said third screen, and
   a means mounted in said entranceway for selectively closing said entranceway to bar entrance into the beehive of the pollen carrying bees,
   said entranceway comprising an elongated opening extending laterally of the movement of the drawer in the pollen trap, and
   said means comprising a single elongated bar pivotally mounted at its midpoint in said entranceway for closing said entranceway when pivotally mounted to a given position, said bar having a length substantially equal to the length of said elongated opening so that when the bar is rotated past said given position, bees can enter the hive at each end of the bar.
2. The pollen trap set forth in claim 1 wherein: said entranceway is positioned above said drawer.
3. The pollen trap set forth in claim 1 wherein: said entranceway is positioned below said drawer.

* * * * *